US012392479B2

(12) United States Patent
Hsu

(10) Patent No.: US 12,392,479 B2
(45) Date of Patent: Aug. 19, 2025

(54) LAMP FIXING DEVICE

(71) Applicant: DONGGUAN JIASHENG LIGHTING TECHNOLOGY CO., LTD., Dongguan (CN)

(72) Inventor: Chih-Pin Hsu, Dongguan (CN)

(73) Assignee: DONGGUAN JIASHENG LIGHTING TECHNOLOGY CO., LTD., Dongguan (CN)

( * ) Notice: Subject to any disclaimer, the term of this patent is extended or adjusted under 35 U.S.C. 154(b) by 0 days.

(21) Appl. No.: 18/739,309

(22) Filed: Jun. 10, 2024

(65) Prior Publication Data

US 2024/0328610 A1 Oct. 3, 2024

(30) Foreign Application Priority Data

Apr. 29, 2024 (CN) ........................ 202420927709.5

(51) Int. Cl.
*F21V 21/08* (2006.01)
*F21V 19/02* (2006.01)
*F21V 21/008* (2006.01)

(52) U.S. Cl.
CPC .......... *F21V 21/0816* (2013.01); *F21V 19/02* (2013.01); *F21V 21/008* (2013.01)

(58) Field of Classification Search
CPC ..... F21V 21/008; F21V 21/0816; F21V 19/02
See application file for complete search history.

(56) References Cited

U.S. PATENT DOCUMENTS 6,637,083 B1 * 10/2003 Howell ................ A44B 11/263 24/615
6,736,529 B1 * 5/2004 Lee ....................... F21V 21/084 362/269
7,513,660 B2 * 4/2009 Spartano ................ F21V 29/70 362/373
11,846,384 B1 * 12/2023 Man ........................ F21V 21/30
2005/0157488 A1 * 7/2005 Ford .................. F21V 21/0816 362/105
2013/0021801 A1 * 1/2013 Lee ....................... F21V 21/084 362/372
2013/0301242 A1 * 11/2013 Sharrah .................. F21V 5/006 362/105
2015/0192282 A1 * 7/2015 Ormsbee ................... F21L 4/04 315/307
2017/0211759 A1 * 7/2017 Qiu ....................... F21V 21/084
2018/0202207 A1 * 7/2018 Eichelberger ........... F21V 23/04
2024/0027058 A1 * 1/2024 Cabot ....................... F21L 4/04

* cited by examiner

*Primary Examiner* — Zheng Song
(74) *Attorney, Agent, or Firm* — Addison D. Ault; IPGentleman Intellectual Property Services, LLC

(57) ABSTRACT

Disclosed is a lamp fixing device, including a fixing base, a mounting joint and a strap, where the mounting joint is connected to one side of the fixing base and configured to mount a lamp, a snap-fitting groove is formed on the other side of the fixing base, both side edges of the snap-fitting groove are provided with one extension portion, respectively, and at least one first through hole is formed on each extension portion, such that two extension portions can be attached to a same plane and fixed to the same plane through the first through holes and screws; and the strap passes through and is disposed on the fixing base. The lamp fixing device, featuring various fixing methods and good firmness, can effectively fix the lamp on different objects according to actual needs of different users.

9 Claims, 4 Drawing Sheets

LAMP FIXING DEVICE

TECHNICAL FIELD

The present disclosure relates to the technical field of lamps, and particularly relates to a lamp fixing device.

BACKGROUND

Lighting fixtures are widely used in daily life. In most cases, different accessories are required to fix the lighting fixtures to facilitate usage in different situations. However, existing lighting fixtures are generally only fixed with the original accessories when they are purchased, and other accessories are difficult to be used as alternatives, making the lighting fixtures fixed in a single way and usually restricting the installation of the lighting fixtures to specific objects. Therefore, it is difficult to fix the lighting fixtures on various objects according to specific needs of users, thus failing to meet diverse requirements and achieve various lighting effects.

It is evident that the prior art for lamp fixing devices needs further improvement.

SUMMARY

In view of the foregoing problems, the present disclosure provides a lamp fixing device, which solves the technical problems that the existing lighting fixtures have a single fixing method and are difficult to match with non-original accessories and fix on various objects.

The technical solution of the present disclosure is as follows:

The present disclosure provides a lamp fixing device, including:

- a fixing base;
- a mounting joint for mounting a lamp, the mounting joint is connected to one side of the fixing base, a snap-fitting groove is formed on the other side of the fixing base, both side edges of the snap-fitting groove are provided with one extension portion, respectively, and at least one first through hole is formed on each extension portion, such that two extension portions can be attached to a same plane and fixed to the same plane through the first through holes and screws; and
- a strap, and the strap passes through and is disposed on the fixing base;

According to an embodiment of the present disclosure, sawteeth are formed on an inner wall of the snap-fitting groove.

According to an embodiment of the present disclosure, the snap-fitting groove is a right-angled groove, a V-shaped groove, a U-shaped groove, or an arc-shaped groove.

According to an embodiment of the present disclosure, a second through hole is formed on the fixing base to hang the lamp fixing device.

According to an embodiment of the present disclosure, a size of the second through hole is greater than that of the first through hole.

According to an embodiment of the present disclosure, the strap is provided with a buckle.

According to an embodiment of the present disclosure, the fixing base is provided with a first connecting part, the mounting joint is provided with a second connecting part, the first connecting part and the second connecting part are attached and coaxially connected through a shaft rod, and meshing teeth are formed on side surfaces of the first connecting part and the second connecting part that face each other, such that the first connecting part and the second connecting part are meshed with each other and can rotate relative to each other.

According to an embodiment of the present disclosure, the lamp fixing device includes a knob, where the knob, the first connecting part and the second connecting part are coaxially connected, and the knob is located on a side of the second connecting part away from the first connecting part, such that the knob can drive the second connecting part to rotate relative to the first connecting part.

According to an embodiment of the present disclosure, the mounting joint is provided with a threaded connecting portion for threaded connection with the lamp.

According to an embodiment of the present disclosure, the mounting joint is further provided with a screw mounting portion, and the screw mounting portion is located beside the threaded connecting portion and is provided with a through hole for mounting a screw.

Compared with the prior art, the lamp fixing device provided by the present disclosure has the following beneficial effects:

Compared with the existing lamp fixing devices, the lamp fixing device provided by the present disclosure has a the snap-fitting groove formed on one side of the fixing base, and the strap passes through and is disposed on the fixing base, such that after the lamp is mounted on the mounting joint, the lamp and the lamp fixing device can be integrally surrounded and fixed on the columnar object or the tree trunk through the strap, and the snap-fitting groove of the fixing base can be snap-fitted on the surface of the columnar object or the tree trunk, thereby making the mounting of the lamp more stable and preventing the lamp from rotating around the columnar object or the tree trunk; moreover, both side edges of the snap-fitting groove are provided with one extension portion, respectively, and at least one first through hole is formed on each extension portion, and two extension portions can be attached to the same plane, such that the fixing base can be fixed on a mounting surface such as a wall or a table top through the screws and the first through hole, and the lamp can be directly mounted on a wall surface, a table top, and other object surfaces. The lamp fixing device provided by the present disclosure has a variety of use modes, and the user can fix a lamp on different objects according to actual needs, thereby achieving various different lighting effects and being good in firmness.

BRIEF DESCRIPTION OF THE DRAWINGS

In order to more clearly illustrate the technical solution in embodiments of the present disclosure or in the prior art, a brief introduction to the accompanying drawings required for the description of the embodiments or the prior art will be provided below. Obviously, the accompanying drawings in the following description are merely some embodiments of the present disclosure. Those of ordinary skill in the art would also derive other accompanying drawings from these accompanying drawings without making inventive efforts.

Figure 1:
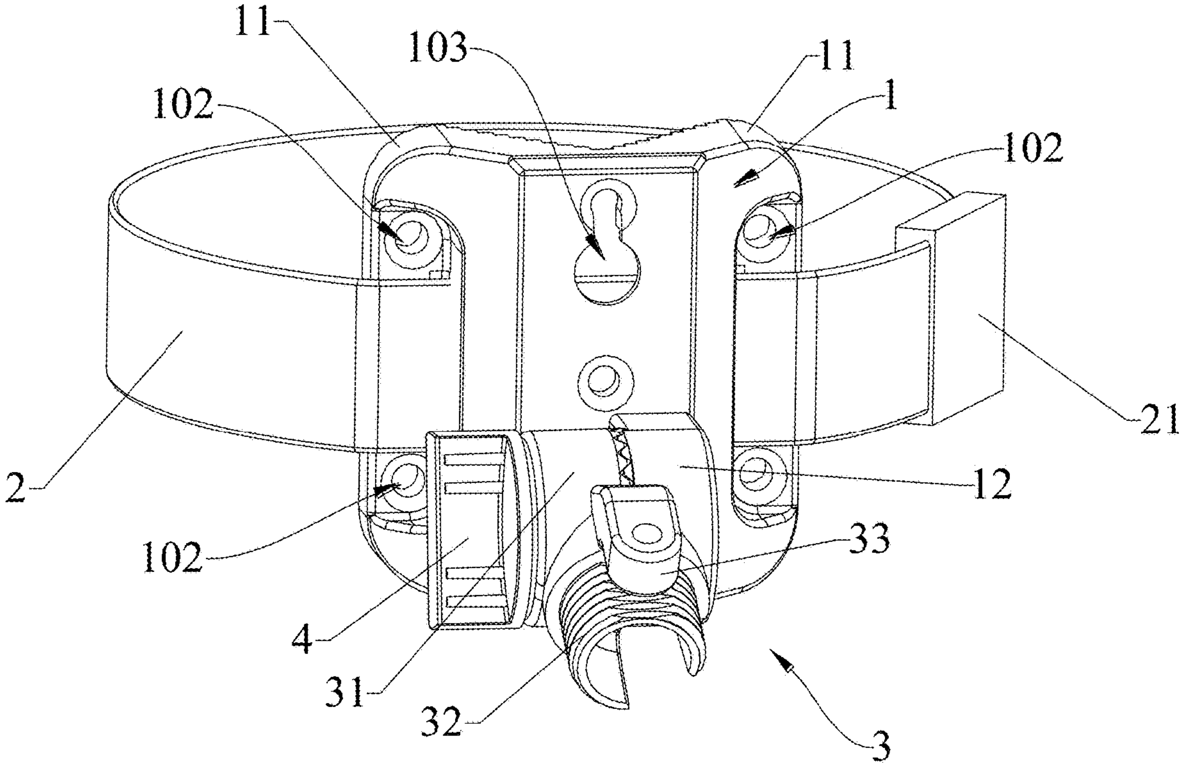
FIG. 1 is a perspective view of a lamp fixing device according to an embodiment of the present disclosure viewed from one angle of view.

Reference numerals in the accompanying drawings:

1. fixing base; 101. snap-fitting groove; 102. first through hole; 103. second through hole; 11. extension portion; 12. first connecting portion; 121. meshing teeth; 2. strap; 21. buckle; 3. mounting joint; 31. second connecting portion; 311. meshing teeth; 32. threaded connecting portion; 33. screw connecting portion; and 4. knob.

DETAILED DESCRIPTIONS OF THE EMBODIMENTS

The technical solutions in the embodiments of the present disclosure are described below clearly and comprehensively in conjunction with the embodiments of the present disclosure. It is obvious that the embodiments described are merely a part of, not all of, embodiments of the present disclosure. All other embodiments obtained by those of ordinarily skilled in the art based on the embodiments of the present disclosure without making creative efforts fall within the scope of protection of the present disclosure.

It can be understood by those skilled in the art that singular forms "a/an", "one", "said" and "the" used herein may also include plural forms unless expressly stated. It should be further understood that the word "comprise/include" used in the description of the present disclosure means presence of stated features, integers, steps, operations, elements and/or components, but does not exclude the presence or addition of one or more other features, integers, steps, operations, elements, components and/or groups thereof. It should be understood that when an element is referred to as being "connected" or "coupled" to another element, it may be directly connected or coupled to another element, or intervening elements may also be present. In addition, "connected" or "coupled" as used herein may include wireless connections or wireless couplings. As used herein, the term "and/or" includes all or any unit and all combinations of one or more of the associated listed items.

It can be understood by those skilled in the art that unless otherwise defined, all terms (including technical terms and scientific terms) used herein have the same meanings as those generally understood by those skilled in the art to which the present disclosure belongs. It should also be understood that terms such as those defined in a general dictionary should be understood to have meanings consistent with those in the context of the prior and will not be interpreted in idealized or overly formal meanings unless specifically defined as herein.

Specific content of the present disclosure will be further described below with reference to the accompanying drawings and the description of the embodiments.

Figure 2:
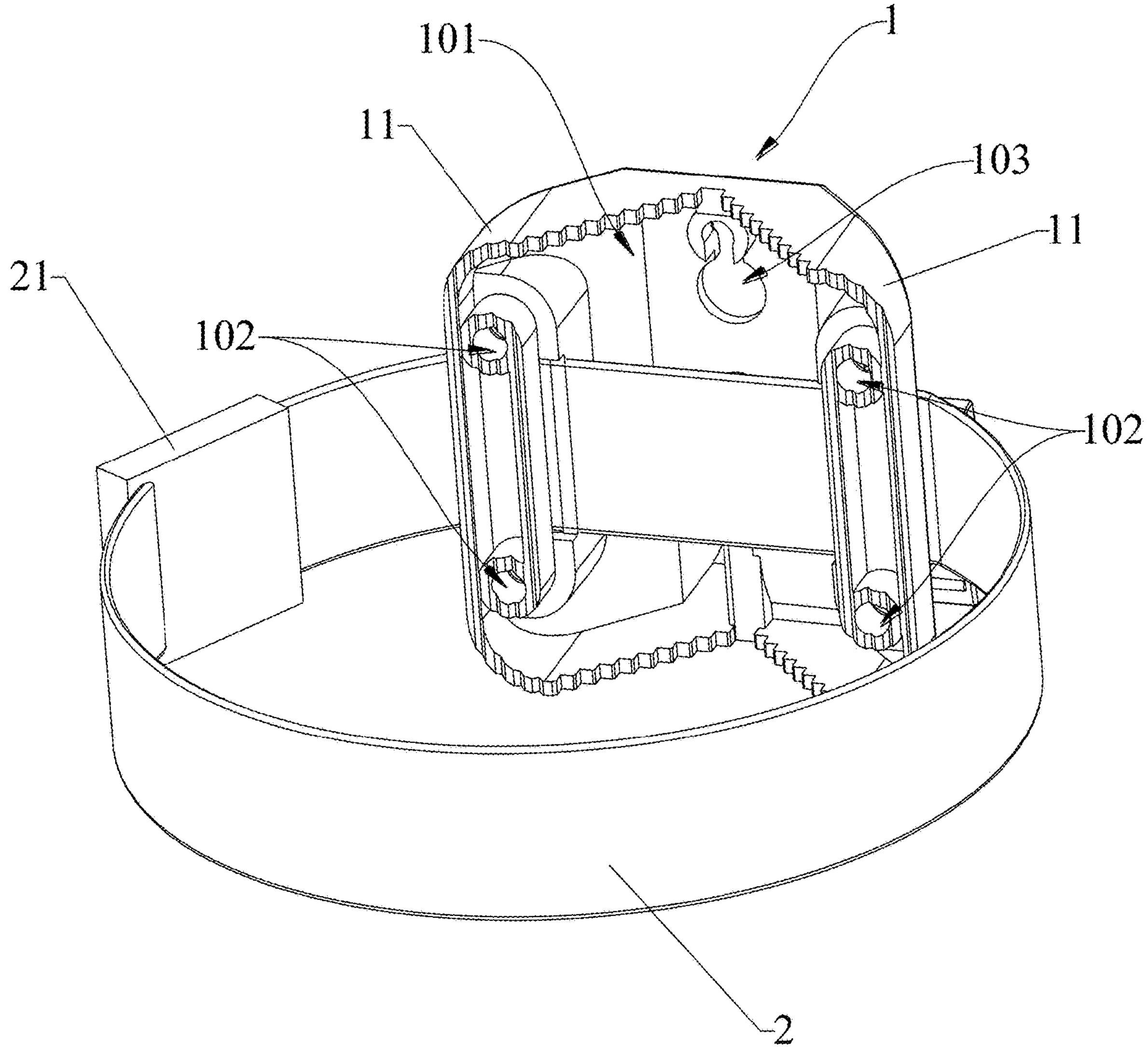
FIG. 2 is a perspective view of a lamp fixing device according to an embodiment of the present disclosure viewed from another angle of view.

As shown in FIGS. 1 and 2, the present disclosure provides a lamp fixing device, which is mainly used for fixing lighting fixtures such as spotlights. The lamp fixing device has a plurality of use modes, and a user can fix a lamp on different objects according to actual needs.

The lamp fixing device includes a fixing base 1, a strap 2 and a mounting joint 3 for mounting the lamp, the mounting joint 3 is connected to one side of the fixing base 1, a snap-fitting groove 101 is formed on the other side of the fixing base 1, both side edges of the snap-fitting groove 101 are provided with one extension portion 11, respectively, at least one first through hole 102 is formed on each extension portion 11, such that two extension portions 11 can be attached to a same plane and fixed to the same plane through the first through holes 102 and screws, and the strap 2 passes through and is disposed on the fixing base 1.

Figure 3:
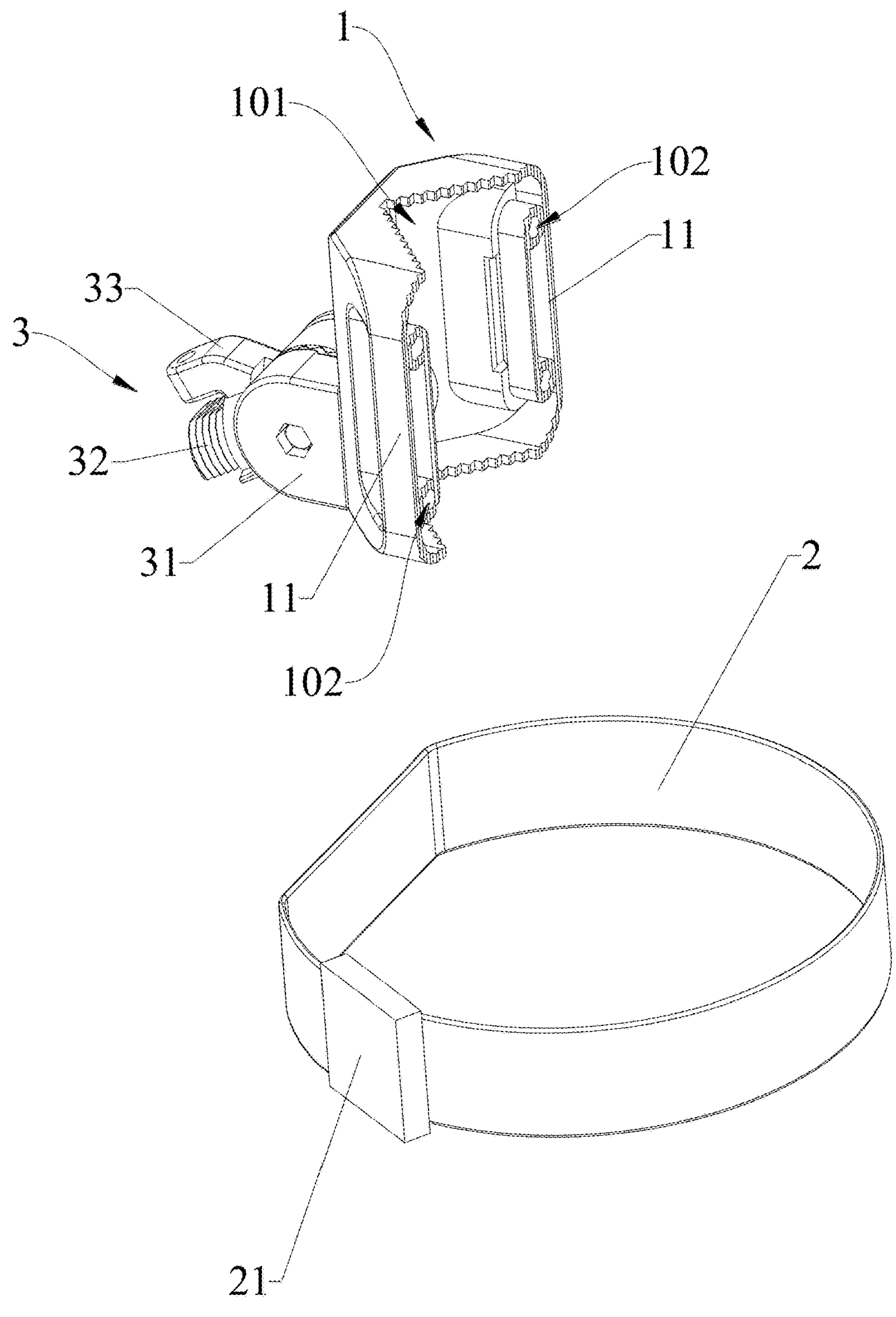
FIG. 3 is a structural schematic diagram after a strap and a fixing base of a lamp fixing device are separated according to an embodiment of the present disclosure after a strap and a fixing base are separated.

Specifically, the fixing base 1 can be a plastic member or a metal member, and the mounting joint 3 can also be a plastic member or a metal member. In order to save costs and use the same material, both the fixing base 1 and the mounting joint 3 can be made of plastic. The mounting joint 3 is configured to mount the lamp, for example, the mounting joint 3 can be correspondingly provided with a plug-in portion or a threaded connection portion for mounting the lamp, and the lamp can be fixedly mounted on the mounting joint 3 in a plug-in or threaded connection manner. The mounting joint 3 is connected to one side of the fixing base 1. The snap-fitting groove 101 is formed on the other side of the fixing base 1, both side edges of the snap-fitting groove 101 are provided with one extension portion 11, respectively, for example, the other side of the fixing base 1 can be recessed inwards to form a V-shaped, U-shaped, or arc-shaped snap-fitting groove 101, and the two side edges of the snap-fitting groove 101 integrally extend to form the extension portions 11, respectively. At least one first through hole 102 is formed on each extension portion 11, for example, a number of the first through hole 102 can be four, each of the extension portions 11 is provided with two first through holes 102, and the four first through holes 102 are symmetrically formed on two sides of the snap-fitting groove 101; and in other embodiments, the number of the first through holes 102 can also be other values, such as two, three or six. The two extension portions 11 are attached to a same plane, as shown in FIGS. 2 and 3, surfaces of the two extension portions 11 on the same side are located on the same plane, such that the two extension portions 11 can be fixed on the same plane through the first through holes 102 and the screws, for example, the two extension portions 11 can be attached to a mounting surface such as a table top or a wall, and then a plurality of screws pass through the first through holes 102 in a one-to-one correspondence manner and are nailed into the mounting surface, such that the fixing base 1 can be fixed on the mounting surface through the screws and the first through holes 102. The strap 2 can be a plastic strap with a buckle, or can be a nylon braided rope or a strap made of other materials. The strap 2 passes through and is disposed on the fixing base 1, for example, the two extension portions 11 of the fixing base 1 are further provided with through holes for the strap 2 to pass through, such that the strap 2 sequentially passes through the through holes on the two extension portions 11. The strap 2 can be wrapped around a columnar object or a tree trunk, in which case, the snap-fitting groove 101 of the fixing base 1 can be snap-fitted on a surface of the columnar object or the tree trunk, and two ends of the strap 2 can be selectively fixed or unlocked, such that the user can bind the lamp to the columnar object or the tree trunk through the lamp fixing device, or can remove the lamp from the columnar object or the tree trunk.

In a use process of the lamp fixing device, one of the use methods is as follows: the plurality of screws penetrate through a plurality of the first through holes 102 of the fixing base 1 in a one-to-one correspondence manner and are nailed into the mounting surface such as a table top or a wall, such that the fixing base 1 can be firstly fixed on the mounting surface, the lamp is then mounted on the mounting joint 3, and the lamp is accordingly fixed, the use method does not require the use of the strap 2.

The other use method is as follows: the lamp is first mounted on the mounting joint 3, the strap 2 is then wrapped around a columnar object or a tree trunk, the snap-fitting groove 101 of the fixing base 1 is snap-fitted on a surface of the columnar object or the tree trunk, and the two ends of the strap 2 are then fixed, such that the lamp fixing device and the lamp as a whole are fixedly mounted on the columnar object or the tree trunk.

For the lamp fixing device provided by the present disclosure, the snap-fitting groove 101 is formed on one side of the fixing base 1, one extension portion 11 is formed on each side edge of the snap-fitting groove 101, the two extension portions 11 can be attached to the same plane and are respectively provided with the first through hole 102, and the strap 2 passes through and is disposed on the fixing base 1, such that on the one hand, the lamp fixing device can be fixed to the columnar object or the tree trunk in a surrounding manner through the strap 2, and the snap-fitting groove 101 can be snap-fitted on a surface of the columnar object or the tree trunk, thereby improving the stability; and on the other hand, the two extension portions 11 of the fixing base 1 can also be attached to and fixedly mounted on a mounting surface by means of screws and the first through holes 102, such that the lamp fixing device and the lamp are fixedly mounted at positions such as a table top or a wall. Therefore, the user can flexibly choose different methods according to actual needs, so as to mount the lamp on different objects.

According to an embodiment of the present disclosure, sawteeth are formed on an inner wall of the snap-fitting groove 101. The sawteeth are configured to increase friction force between the fixing base 1 and other objects when the strap 2 cooperates with one side of the fixing base 1 having the snap-fitting groove 101, so as to fix the lamp fixing device to other objects. As shown in FIGS. 2 and 3, sawteeth are formed on the inner wall of the snap-fitting groove 101, such that when the snap-fitting groove 101 is snap-fitted on a surface of an object such as a columnar object or a tree trunk, the sawteeth can increase friction force between the inner wall of the snap-fitting groove 101 and the surface of the object such as the columnar object or the tree trunk, thereby increasing the stability of the snap-fitting.

According to an embodiment of the present disclosure, the snap-fitting groove 101 is a right-angled groove, a V-shaped groove, a U-shaped groove, or an arc-shaped groove. As shown in FIGS. 2 and 3, in this embodiment, the snap-fitting groove 101 is the right-angled groove, such that the snap-fitting groove 101 can be well snap-fitted with a square column, and the lamp fixing device can be conveniently fixed on the square column through the snap-fitting groove 101 and the strap 2. In other embodiments, the snap-fitting groove 101 is the arc-shaped groove, such that the snap-fitting groove 101 can be well snap-fitted with a cylinder, and the lamp fixing device can be conveniently fixed on the cylinder through the snap-fitting groove 101 and the strap 2. In other embodiments, the snap-fitting groove 101 can also be the V-shaped groove or the U-shaped groove, and the snap-fitting groove 101 in these shapes can all increase the friction force with the columnar object, thereby improving the stability of the snap-fitting.

According to an embodiment of the present disclosure, a second through hole 103 is formed on the fixing base 1 to hang the lamp fixing device. As shown in FIG. 1, the second through hole 103 is formed on the fixing base 1 to hang the lamp fixing device, the second through hole 103 is roughly located in a middle of the fixing base 1 and located between the two extension portions 11, such that the lamp fixing device can be hung on a nail or a hook on a wall through the second through hole 103, and the lamp mounted on the mounting joint 3 can be hung.

By providing the second through hole 103, the lamp fixing device can be hung on a nail or a hook. When taking this use method, the first through hole 102 and the screws are not required, and the strap 2 is not required, either.

According to an embodiment of the present disclosure, a size of the second through hole 103 is greater than that of the first through hole 102. As shown in FIG. 1, in this embodiment, the second through hole 103 is a gourd-shaped through hole, and the size of the second through hole 103 is greater than that of the first through hole 102, such that on the one hand, it is convenient to distinguish the first through hole 102 from the second through hole 103; and on the other hand, the second through hole 103 can be made in larger, allowing the user to hang the lamp fixing device on the nail or the hook through the second through hole 103.

According to an embodiment of the present disclosure, the strap 2 is provided with a buckle 21. As shown in FIGS. 1-4, the strap 2 is provided with the buckle 21, such that the two ends of the strap 2 can be fixed or unbuckled by the buckle 21. After the user wraps and fixes the strap 2 around the columnar object or the tree trunk, the two ends of the strap 2 can be fixed together by the buckle 21. The user can also unbuckle the buckle 21 to remove the lamp fixing device and the lamp from the columnar object or the tree trunk.

According to an embodiment of the present disclosure, the fixing base 1 is provided with a first connecting part 12, the mounting joint 3 is provided with a second connecting part 31, and the first connecting part 12 and the second connecting part 31 are attached and coaxially connected through a shaft rod. Meshing teeth are formed on side surfaces of the first connecting part 12 and the second connecting part 31 that face each other, such that the first connecting part 12 and the second connecting part 31 are meshed with each other and can rotate relative to each other.

Figure 4:
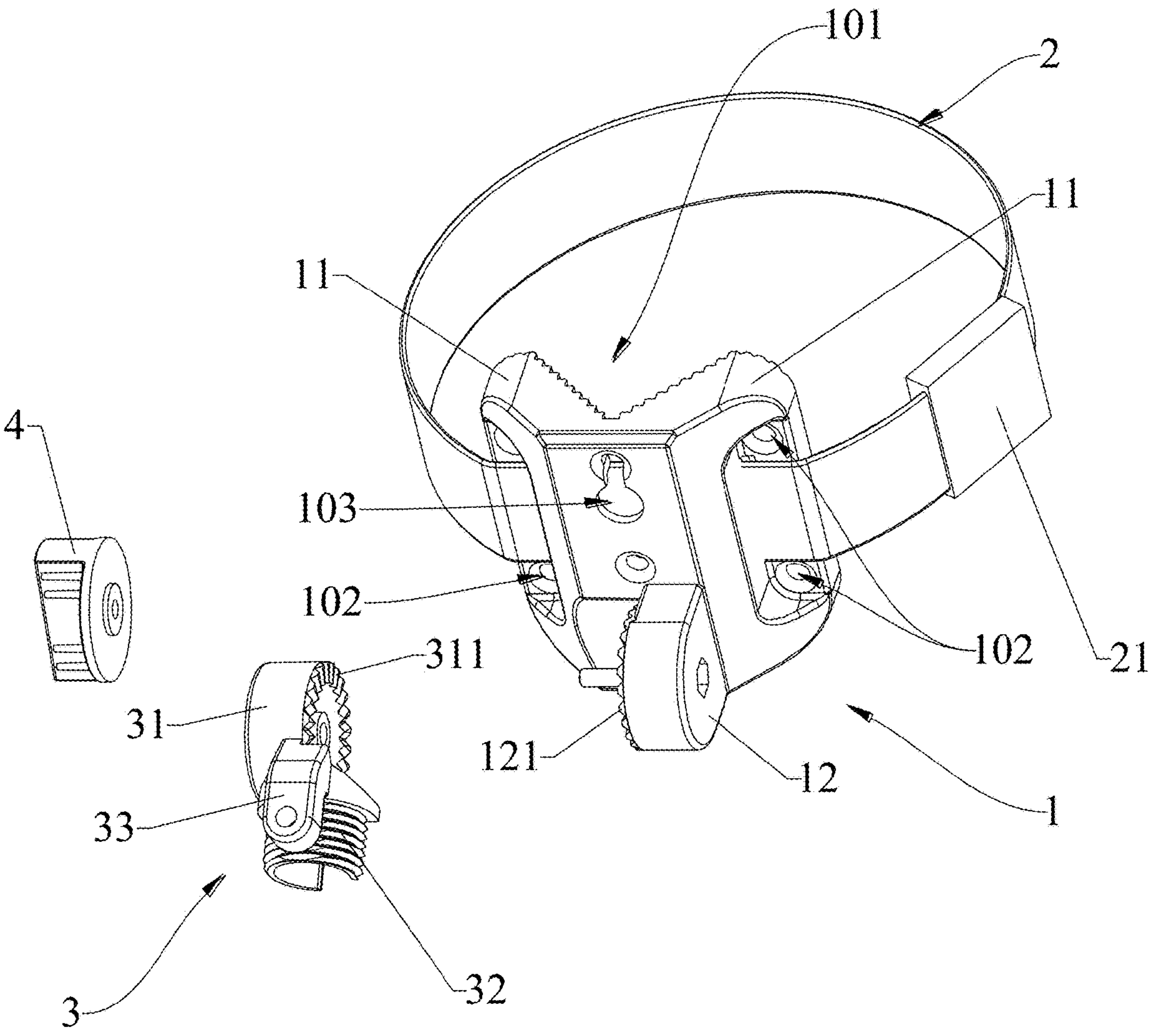
FIG. 4 is a structural schematic diagram after a mounting joint, a knob and a fixing base of a lamp fixing device are separated according to an embodiment of the present disclosure.

As shown in FIG. 4, the fixing base 1 is provided with the first connecting part 12, the first connecting part 12 is located between the two extension portions 11, and the first connecting part 12 integrally protrudes from a surface of the fixing base 1. The mounting joint 3 is provided with the second connecting part 31. The first connecting part 12 and the second connecting part 31 are attached and each is provided with a through hole, and the first connecting part 12 and the second connecting part 31 are coaxially connected through the shaft rod, that is, the shaft rod sequentially passes through the through holes of the first connecting part 12 and the second connecting part 31, such that the first connecting part 12 and the second connecting part 31 are connected as a whole. The side surface of the first connecting part 12 facing the second connecting part 31 is provided with the meshing teeth 121, the side surface of the second connecting part 31 facing the first connecting part 12 is correspondingly provided with the meshing teeth 311, and the meshing teeth 121 of the first connecting part 12 are meshed with the meshing teeth 311 of the second connecting part 31, such that the fixing base 1 is firmly engaged with the mounting joint 3. In addition, under the action of external force, the first connecting part 12 and the second connecting part 31 can rotate relative to each other by overcoming restraining force between the meshing teeth 121 and the meshing teeth 311, such that the user can rotate the second connecting part 31 of the mounting joint 3 to drive the second connecting part 31 to rotate relative to the first connecting part 12, thereby adjusting an illumination angle of the lamp mounted on the mounting joint 3. More importantly, when the second connecting part 31 rotates relative to the first connecting part 12, the user can accurately adjust the illumination angle of the lamp based on the feeling when the meshing teeth of the first connecting part and the second connecting part slide relative to each other and the number of meshing teeth sliding relative to each other.

According to an embodiment of the present disclosure, the lamp fixing device includes a knob 4, where the knob 4, the first connecting part 12 and the second connecting part 31 are coaxially connected, and the knob 4 is located on a side of the second connecting part 31 away from the first connecting part 12, such that the knob 4 can drive the second connecting part 31 to rotate relative to the first connecting part 12.

As shown in FIG. 4, the knob 4 is circular, a through hole is formed on a center of the knob 4, and the shaft rod connecting the first connecting part 12 and the second connecting part 31 passes through the through hole in the center of the knob 4, such that the knob, the first connecting part and the second connecting part are coaxially connected and attached together. The knob 4 is located on the side of the second connecting part 31 away from the first connecting part 12, that is, the second connecting part 31 is located between the first connecting part 12 and the knob 4. Further, the second connecting part 31 and the knob 4 are both in interference fit with the shaft rod, and the user can rotate the knob 4 to drive the second connecting part 31 to rotate relative to the first connecting part 12, thereby adjusting a rotation angle of the lamp mounted on the mounting joint 3.

By providing the knob 4, the user can easily adjust the rotation angle of the lamp by operating the knob 4, thereby improving the use experience.

According to an embodiment of the present disclosure, the mounting joint 3 is provided with a threaded connecting portion 32 for threaded connection with the lamp. Specifically, in this embodiment, the threaded connecting portion 32 is a threaded tube integrally formed on the mounting joint 3, and an end of the lamp is correspondingly provided with a threaded connecting portion, such that the threaded connecting portion at the end of the lamp is nested in the threaded tube of the mounting joint 3, and the threaded connecting portion and the threaded tube are tightened by threads. In other embodiments, the mounting joint 3 can also be provided with other types of mounting structures to facilitate the mounting of the lamp on the mounting joint 3.

The threaded connecting portion 32 disposed on the mounting joint 3 can facilitate the mounting of the lamp, and the structure is simple.

According to an embodiment of the present disclosure, the mounting joint 3 is further provided with a screw mounting portion 33, and the screw mounting portion 33 is located beside the threaded connecting portion 32 and is provided with a through hole for mounting a screw. Specifically, as shown in FIGS. 1, 3 and 4, the screw mounting portion 33 is integrally formed on the mounting joint 3 and is located beside the threaded connecting portion 32, and the through hole is formed on the screw mounting portion 33. To mount the lamp, when the threaded connecting portion of the end of the lamp and the threaded connecting portion 32 of the mounting joint 3 are screwed together to a bottom, and the illumination angle of the lamp is not a required angle, the threaded connecting portion of the end of the lamp can be screwed in a reverse direction until the lamp is at a suitable angle position, to make the illumination angle of the lamp meet the requirements; then one screw is inserted into the through hole of the screw mounting portion 33, such that an end of the screw can be tightly abutted against an outer surface of the threaded connecting portion of the lamp, and the lamp is accordingly fixed, in this way, the user does not need to repeatedly adjust and mount the lamp, and the illumination angle of the lamp can meet the requirement through a one-time mounting, which is simple and easy to operate.

To sum up, the lamp fixing device provided by the present disclosure has a variety of use methods. One of the use methods is as follows: first, the fixing base 1 is fixed, that is, a screw is passed through the first through hole 102 and nailed into an object where the lamp needs to be mounted; the knob 4, the first connecting portion 12 of the fixing base 1 and the second connecting portion 31 of the mounting joint 3 are connected and clamped through the shaft rod; and the lamp is finally mounted on the threaded connecting portion 32 of the mounting joint 3.

The other use methods is as follows: the knob 4, the first connecting portion 12 of the fixing base 1 and the second connecting portion 31 of the mounting joint 3 are firstly connected and clamped through the shaft rod; the lamp is then mounted on the threaded connecting portion 32 of the mounting joint 3; and the strap 2 is finally wrapped around a columnar object, and at the same time, the snap-fitting groove 101 of the fixing base 1 is snap-fitted on a surface of the columnar object, and the two ends of the strap 2 are fixed through the buckle, such that the lamp is bound to the columnar object.

Another use methods is as follows: the knob 4, the first connecting portion 12 of the fixing base 1 and the second connecting portion 31 of the mounting joint 3 are firstly connected and clamped through the shaft rod; the lamp is then mounted on the threaded connecting portion 32 of the mounting joint 3; and the lamp fixing device and the lamp are finally hung on a screw or a hook together through the second through hole 103.

The user can mount the lamp on different objects according to actual needs, for example, the lamp can be fixedly mounted on a surface of the table top or other objects, or the lamp can be hung on a wall, and the lamp can also be bound to the columnar object or the tree trunk, such that the requirements of various lighting scenes of the user are satisfied, and a variety of different lighting effects are achieved. The user can also accurately adjust the illumination angle of the lamp through the knob. In addition, when the lamp is mounted on the mounting joint 3 in a threaded manner, and the mounting angle that the lamp is screwed to the bottom does not meet the requirements, the lamp can also be screwed in the reverse direction to an angle position that meets the requirements, and the lamp is abutted against and fixed through the screw located in the screw mounting portion 33, such that the complexity of repeatedly adjusting and mounting the lamp is avoided.

What are described above are merely preferred embodiments of the present disclosure. Any modifications, equivalent replacements and improvements, etc. made within the spirit and principle of the present disclosure should fall within the scope of protection of the present disclosure.

What it claimed is:

1. A lamp fixing device comprising:

a fixing base;

a mounting joint for mounting a lamp, the mounting joint is connected to one side of the fixing base, a snap-fitting groove is formed on the other side of the fixing base, both side edges of the snap-fitting groove are provided with one extension portion, respectively, and at least one first through hole is formed on each extension portion, such that two extension portions can be attached to a same plane and fixed to the same plane through the first through holes and screws; and a strap, and the strap passes through and is disposed on the fixing base;

wherein the fixing base is provided with a first connecting part, the mounting joint is provided with a second connecting part, the first connecting part and the second connecting part are attached and coaxially connected through a shaft rod, and meshing teeth are formed on side surfaces of the first connecting part and the second connecting part that face each other, such that the first connecting part and the second connecting part are meshed with each other and can rotate relative to each other.

2. The lamp fixing device according to claim 1, wherein the mounting joint is provided with a threaded connecting portion for threaded connection with the lamp.

3. The lamp fixing device according to claim 2, wherein the mounting joint is further provided with a screw mounting portion, and the screw mounting portion is located beside the threaded connecting portion and is provided with a through hole for mounting a screw.

4. The lamp fixing device according to claim 1, wherein the lamp fixing device comprises a knob, the knob, the first connecting part and the second connecting part are coaxially connected, and the knob is located on a side of the second connecting part away from the first connecting part, such that the knob can drive the second connecting part to rotate relative to the first connecting part.

5. The lamp fixing device according to claim 1, wherein sawteeth are formed on an inner wall of the snap-fitting groove.

6. The lamp fixing device according to claim 1, wherein the snap-fitting groove is a right-angled groove, a V-shaped groove, a U-shaped groove, or an arc-shaped groove.

7. The lamp fixing device according to claim 1, wherein a second through hole is formed on the fixing base to hang the lamp fixing device.

8. The lamp fixing device according to claim 1, wherein a size of the second through hole is greater than that of the first through hole.

9. The lamp fixing device according to claim 1, wherein the strap is provided with a buckle.

* * * * *